United States Patent
Yoshioka et al.

(10) Patent No.: US 7,632,363 B2
(45) Date of Patent: Dec. 15, 2009

(54) METHOD FOR REFURBISHING A SERVICE-DEGRADED COMPONENT OF A GAS TURBINE

(75) Inventors: Yomei Yoshioka, Kanagawa-ken (JP); Daizo Saito, Kanagawa-ken (JP); Junji Ishii, Kanagawa-ken (JP); Yoshihiro Aburatani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 11/149,231

(22) Filed: Jun. 10, 2005

(65) Prior Publication Data

US 2006/0016527 A1   Jan. 26, 2006

(30) Foreign Application Priority Data

Jun. 11, 2004   (JP)   ............... 2004-174358

(51) Int. Cl.
  *C22F 1/10*   (2006.01)
(52) U.S. Cl. ..................... 148/677; 148/671
(58) Field of Classification Search ............. 148/677, 148/671
  See application file for complete search history.

(56) References Cited

U.S. PATENT DOCUMENTS 5,077,004 A   12/1991   Schweizer et al.

FOREIGN PATENT DOCUMENTS

| GB | 1 501 064 | 2/1978 |
|---|---|---|
| GB | 1 510 824 | 5/1978 |
| GB | 2 098 119 A | 11/1982 |
| JP | 51-014131 | 2/1976 |
| JP | 51-151253 | 12/1976 |
| JP | 55-113833 A | 9/1980 |
| JP | 57-062884 A | 4/1982 |
| JP | 57-207163 A | 12/1982 |
| JP | 04-006789 A | 1/1992 |
| JP | 11-335802 A | 12/1999 |
| JP | 2000-080455 A | 3/2000 |
| JP | 2001-240950 A | 9/2001 |
| JP | 2001240950 A * | 9/2001 |
| JP | 03538106 B2 | 3/2004 |

* cited by examiner

*Primary Examiner*—Roy King
*Assistant Examiner*—Weiping Zhu
(74) *Attorney, Agent, or Firm*—Foley & Lardner LLP

(57) ABSTRACT

A method for refurbishing service-degraded gas turbine component can recover the microstructure of the alloy of the gas turbine component, whose material is deteriorated or damaged after its operation, to the extent that is equivalent or more than the characteristic at the time of its manufacture. The method comprises performing a recovery heat treatment, performing a solution heat treatment, and performing an aging heat treatment. The recovery heat treatment heat-treats the component under a predetermined pressure, which is higher than normal pressure, wherein the temperature of the component is increased to a predetermined temperature under the predetermined pressure. The solution heat treatment is processed under reduced pressure or inert gas atmosphere after the recovery heat treatment. The aging heat treatment is processed under reduced pressure or inert gas atmosphere after the recovery heat treatment.

19 Claims, 10 Drawing Sheets

HIP Processed Blade

Blade Heat-Treated under Reduced Pressure

METHOD FOR REFURBISHING A SERVICE-DEGRADED COMPONENT OF A GAS TURBINE

CROSS REFERENCE TO RELATED APPLICATION

This application is based upon and claims the benefit of priority from prior Japanese Patent Application No. 2004-174358 filed on Jun. 11, 2004, the entire contents of which are incorporated herein by reference.

FIELD OF THE INVENTION

This invention relates to a method for refurbishing service degraded gas turbine components, and, in particular, a refurbishing process using Hot Iso-static Press (HIP) method.

BACKGROUND

In a gas turbine plant, compressed air from a compressor, which is provided coaxially with a gas turbine, is introduced into a combustor together with fuel. High temperature combustion gas, which is caused by combustion of the fuel with the compressed air in the combustor, is introduced to turbine blades via transition pieces and turbine nozzles. The combustion gas drives turbine blades of the gas turbine to produce work to drive a generator, which is coupled to the gas turbine.

A heat resistant superalloy is applied to one or more components of the gas turbine, such as a combustion liner, a transition piece, a turbine blade or a turbine nozzle, which are exposed to the high temperature in the gas turbine. A nickel base superalloy is used for the turbine blade, where high temperature strength is especially needed. The nickel base superalloy is a precipitation strengthening type alloy, and its high temperature strength is achieved by precipitation of intermetallic compound of $Ni_3(Ai, Ti)$, which is referred to as "γ' phase", in a nickel matrix.

Although the nickel base superalloy has high heat resistance, however, various damages or defects (referred to as "damages") may be observed in the nickel base superalloy after the gas turbine has been operated for certain period. This damage is caused by degradation of the material, erosion, corrosion or oxidization, which is more likely to occur for the gas turbine component such as turbine blade in the high temperature environment, in which the gas turbine components are exposed. Further, creep damages accumulate in the turbine blade due to centrifugal stress caused by the operation of the gas turbine. When the gas turbine plant starts or stops operating, further damages accumulate in the gas turbine blade by the thermal fatigues due to the change of temperature in addition to the centrifugal stress.

In general, a turbine blade is scrapped when it reaches its design life. For example, a turbine blade for the first stage of the 1,100 degrees centigrade class gas turbine operated for the base-load purpose having an oxidation-resistant and corrosion-resistant coating on its surface has 48,000 hours until it is scrapped. If the turbine blade is re-coated, such re-coating of the oxidation-resistant and corrosion resistant coating is carried out after 24,000 hours operation of the turbine blade. In that case, the re-coated turbine blade is used for 48,000 hours after the re-coating and is then scrapped. At the time of the re-coating, the turbine blade is heat-treated; however, this heat treatment is not intended to refurbish the base metal of the turbine blade.

Other turbine components exposed to the high temperature, such as the turbine nozzle, the combustion liner or the transition piece, are repaired by welding when a crack or an abrasion is found. These turbine components are used again after being repaired. When being repaired, these components are heat-treated to reduce the heat effect caused by welding or residual stress, if it is necessary.

Currently, the temperature of combustion gas introduced to gas turbine is becoming higher to improve the thermal efficiency. Hence the nickel base superalloy, which is used for turbine blade, is starting to be applied to the turbine nozzle, the combustion liner or the transition piece. It is generally known that the nickel base superalloy is difficult to repair or refurbish.

A conventional refurbishment technology for restoration of casting defects of the precision casting is described in the Japanese Patent Publication (Kokai) No. 57-207163. This technology is substantially a HIP process, which compresses defects such as creep voidsand dislocations. This publication describes a technique to perform heat treatment in a wide and general range of temperature (more than a temperature from 600 to 950 degrees centigrade) such as in a range of more than 50%, in a range of 60 to 95%, and in a range of 80-95% of melting point of the component (which is more than 1,000 degrees centigrade).

Japanese Patent Publication (Kokai) No. 51-151253 discloses a technology to remove small defects referred to as "creep voids" caused by creep in a metal component which has been used in the high temperature environment. In this technology, heat treatment is performed in a wide range of temperature, such as, 980 to 1232 degrees centigrade. This range covers the temperature from less than the solvus temperature of the γ' phase to the highest temperature of the beginning of the incipient melting, and is not related with recovering of the γ' phase.

Japanese Patent Publication (Kokai) No. 57-62884 discloses a technology that removes micro defects which are included inside the weld by HIP process after welding. However, heat treatment temperature range, which is disclosed as from about 1,000 to 1250 degrees centigrade, is also wide to cover the temperature from less than the solvus temperature of the γ' phase to the highest temperature of the beginning of the incipient melting. This temperature range is not related with recovering of the γ' phase.

Japanese Patent Publication (Kokai) No. 51-14131 discloses a uniformizing technology that eliminates an opening such as relatively large crack, a crevice or a large hole included in a casting just after its casting process.

Japanese Patent Publication (Kokai) No. 55-113833 discloses a technology applying solution heat treatment in addition to the HIP process to compress voids inside the casting.

However these two publications do not disclose a technology that enables to recover the microstructure of the alloy to the extent that is equivalent to the time of its manufacture, which has microstructure with full solution of the γ' phases without defects caused by incipient melting, by applying solution heat treatment and aging heat treatment after the process of recovery heat treatment under high pressure to the gas turbine component used for the long period in the high temperature environment.

With regard to the gas turbine component of precipitation strengthening type alloy used in the high temperature environment, original property of the material such as creep life, ductility or toughness is reduced when the precipitation strengthening phases disappear or new precipitated phases precipitate by the process of changing shape of precipitated phases due to agglomeration, precipitation or enlargement of precipitated phases. In addition, creeps due to centrifugal or thermal stresses, thermal fatigues due to temperature-strain trajectory by startup/shutdown or the high/low cycle fatigues damage these gas turbine components.

Japanese Patent (Kokoku) No. 4-6789 and Japanese Patent Publication (Kokai) No. 2000-80455 disclose technologies of recovering life using heat treatment that recovers the microstructure of the alloy by elevating the temperature to the dissolving temperature of the γ' phase, which constitutes coarsened main strengthening phase. However, because the incipient melting temperature and the solvus temperature of the γ' phase are close to each other, the strength is reduced due to the incipient melting or the recrystallization. Further, the internal damage (defect) such as the creep void due to the operation cannot be eliminated with this process.

Regarding the material applied to the gas turbine component, an element that cause decline of the melting point tends to segregate along the dendrite boundary. Particularly, around the area where these elements extremely segregate along the dendrite boundary, the melting point is also extremely declined. In this case, the melting point of the area becomes close to the solving temperature of the γ' phases, which are main precipitation strengthening phases. Therefore, these materials are usually heat-treated in the range of temperature that can make appropriate microstructure without causing incipient melting. Hence, it is difficult to recover the microstructure by re-precipitation of the γ' phases, which are main precipitation strengthening phases, after its full solution. Rather, in some situations, it reduces strength or life of the component by further agglomerating γ' phases that have already coarsened by use of the component.

Japanese Patent Publication (Kokai) No. 11-335802 discloses recovering technology that applies a recovery heat treatment process under high pressure environment using HIP process to restore inner defects and recover areas that have incipient melting before applying the solution heat treatment and the aging heat treatment, which are applied in a non-pressurized environment. In this technology, grain boundary strengthening elements such as B, Zr, Hf or C are added to the alloy. These elements segregate along the dendrite boundary during solidification process of alloy. This makes the temperature of incipient melting almost equivalent or less than the temperature of the solvus temperature of the γ' phases. When the recovery heat treatment is applied to this alloy in the temperature higher than the solvus temperature of the γ' phases, the γ' phases can be fullly dissolved in the base metal, which is the γ phases. Since the recovery heat treatment process is applied in the high pressure environment, the pressure closes incipient melting areas even if the incipient meltings occur. Therefore, this technology enables to recover the alloy of the gas turbine component without reduction of the strength due to the incipient melting. The refurbished gas turbine components according to this technology can obtain life and property equivalent, or even greater than, compared to the time of its manufacture. However, in this technology, because the incipient melting area crystallizes and becomes fine grains during its solidification process, the recovering process may not be completed. Thus, recovery of the alloy according to this technology depends on the extent of the incipient melting.

SUMMARY OF THE INVENTION

Accordingly, an advantage of an aspect of the present invention is to provide a method for refurbishing service-degraded gas turbine component that can recover the microstructure of the alloy of the gas turbine component, whose material is deteriorated or damaged after its operation, to the extent that is equivalent or more than the characteristic at the time of its manufacture, which has microstructure with full solution of the γ' phases without the defect due to the incipient melting.

To achieve the above advantage, one aspect of the present invention is to provide a method for refurbishing a service-degraded component of a precipitation strengthening type of alloy for a gas turbine that comprises performing a recovery heat treatment on the component in an environment having a predetermined pressure that is greater than atmospheric pressure, wherein the temperature of the component is increased to a predetermined temperature in the environment having the predetermined pressure; performing a solution heat treatment, which is processed under reduced pressure or inert gas atmosphere, the solution heat treatment being performed after performing the recovery heat treatment, and performing an aging heat treatment, which is processed under reduced pressure or an inert gas atmosphere, the aging heat treatment being performed after performing the recovery heat treatment.

Further features, aspects and advantages of the present invention will become apparent from the detailed description of preferred embodiments that follows, when considered together with the accompanying figures.

DETAILED DESCRIPTION OF THE PREFERRED EMBODIMENTS

The embodiments in accordance with the present invention are explained with reference to drawings.

One aspect of the embodiments according to the present invention is increasing the temperature of the component to a predetermined recovery heat treatment temperature under high pressure environment. This can avoid depression of the incipient melting temperature due to the segregation of the grain boundary strengthening elements, such as B, Zr, Hf and C, or other impurity elements that are inevitability contained such as Pb, Sn and Zn, along the dendrite boundaries. Furthermore, the alloy of the component is recovered without the incipient melting by solving the γ' phases at lower temperature, since the solid solution of the γ' phases is facilitated due to an acceleration of diffusion of elements which form the γ' phases such as Al and Ti.

The refurbished component according this process can obtain life and characteristic, which are equivalent or greater than those of newly manufactured components, without dispersion. Generally, elevation of the melting point, which is equivalent to the incipient melting temperature, in the high pressure environment is observed in an element that has larger thermal expansion coefficient. For example, the melting point of Pb in the environment of the normal pressure is about 600K, whereas it is known that the melting point goes up by 200K in the environment of 500,000 MPa.

Figure 1:
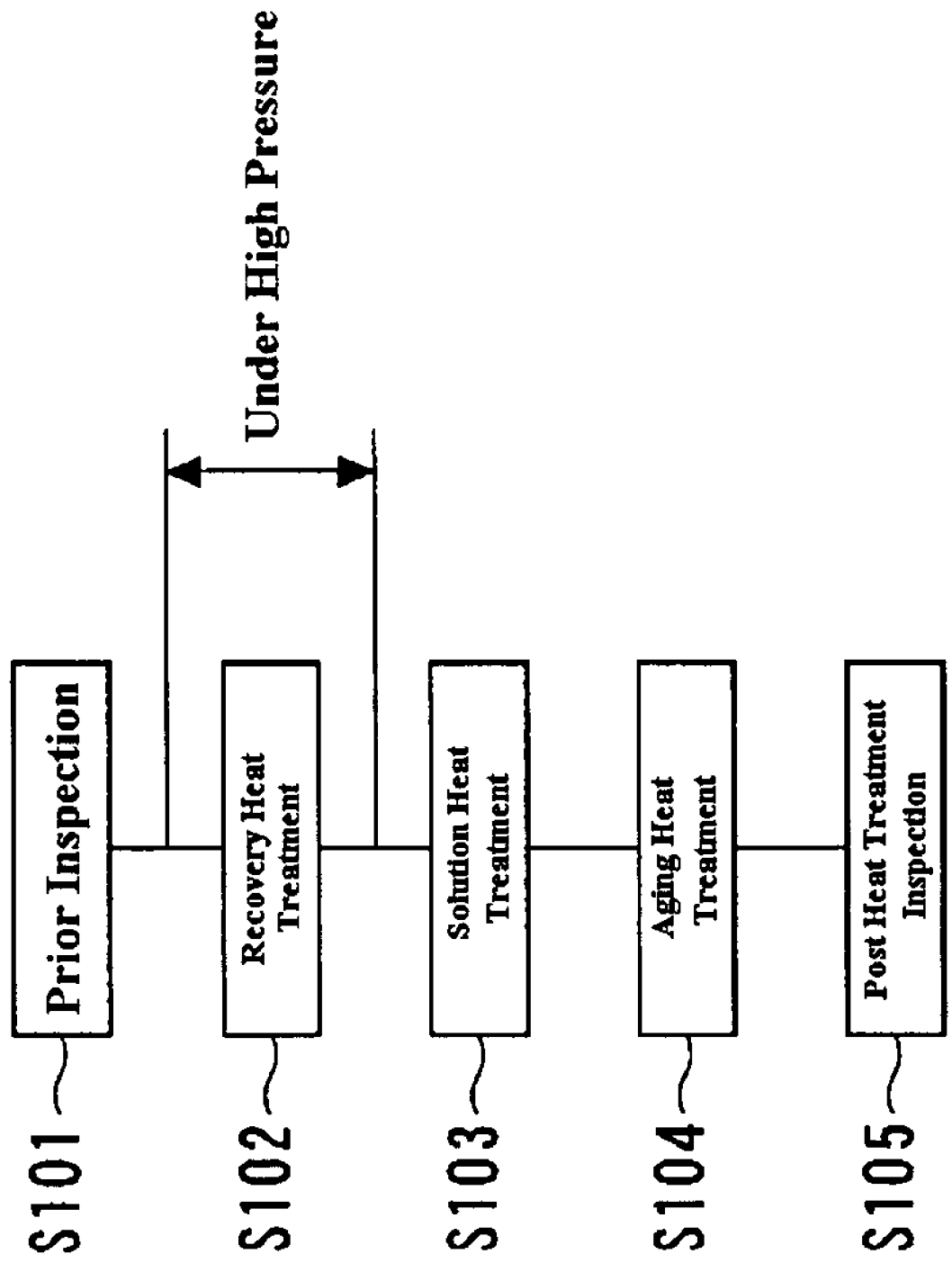
FIG. 1 is a flow chart of the refurbishing method in accordance with the first embodiment.

FIG. 1 is a flow chart of the refurbishing method in accordance with the first embodiment.

As shown in FIG. 1, a refurbishing process includes a prior inspection process S101, a recovery heat treatment process S102, a solution heat treatment process S103, an aging heat treatment process S104, and a post heat treatment inspection process S105.

In the prior inspection process S101, the component, to which the refurbishing process is applied, is visually inspected. When the component has surface damages such as crack, corrosion, oxidation, erosion, or foreign object damage (FOD), these defects are preferably repaired so that there is no such defect on the surface of the component. Without repairing these surface defects of the component, the defects may further enlarge during the refurbishing process. The repair may be done by any process known to one of the ordinary skill in the art such as TIG welding, brazing, or vacuum brazing. The repair may be a coating done by plasma spraying, vacuum plasma spraying, or high velocity oxy-fuel spraying.

Further, since the component is placed under a high temperature and high pressure environment during the refurbishing process, dirt or stain on the surface of the component, which may react with the alloy of the component, should be removed by shot blasting of alumina particles. Especially, when refurbishing a component having a coating layer on its surface, care should be taken to determine whether elements included in the coating layer may diffuse to the alloy of the component, thereby affecting characteristics or life of the component. If there is an element that diffuses and affects characteristics or life of the alloy, the coating layer may be preferably removed before refurbishing.

After the prior inspection process S101, the recovery heat treatment process S102 is applied to the component. In the recovery heat treatment process S102, in which the component is heat-treated under the high pressure environment, the pressure is raised before the heat treatment. The next processes are the solution heat treatment process S103 and the aging heat treatment process S104, both of which are applied under reduced pressure environment or in an inert gas atmosphere. After these processes, the post heat treatment inspection process S105 is applied.

The recovery heat treatment process S102, which is a heat treatment under high pressure environment, can be applied by using an apparatus that includes a pressure vessel having a heater inside, an inert gas tank, a pump that compresses the inert gas in the inert gas tank and introduces it to the pressure vessel, a gas recovery system that recovers the compressed inert gas used in the pressure vessel, and a holder that holds the component inside the pressure vessel.

When this apparatus is used, a gas turbine component, to which the recovery heat treatment is applied, is held on the holder and the holder with the component is set inside the pressure vessel. The component is preferably placed in a soaking zone inside the pressure vessel.

Since the component is set inside the pressure vessel in an air atmosphere, a vacuum must be created inside the pressure vessel. After the air inside the pressure vessel is exhausted, the inert gas, such as an argon, is introduced to the pressure vessel. Vacuuming the pressure vessel and filling with the inert gas may be preferably repeated 2 or 3 times to completely exhaust any air from the pressure vessel.

Then the pressure inside the pressure vessel is increased to a predetermined pressure by introducing high pressure inert gas inside the reaction vessel. The temperature inside the pressure vessel is raised to a predetermined temperature, under the predetermined pressure. With this pressure and temperature, the γ' phases in the alloy may be fully dissolved to the base metal without causing incipient melting, which would be caused by the phenomena that the melting point is locally decreased due to the segregation of elements along the dendrite boundary. Therefore the microstructure of the alloy of the component may be recovered, and damages caused by the defects or the creep fatigues are also recovered.

Figure 2:
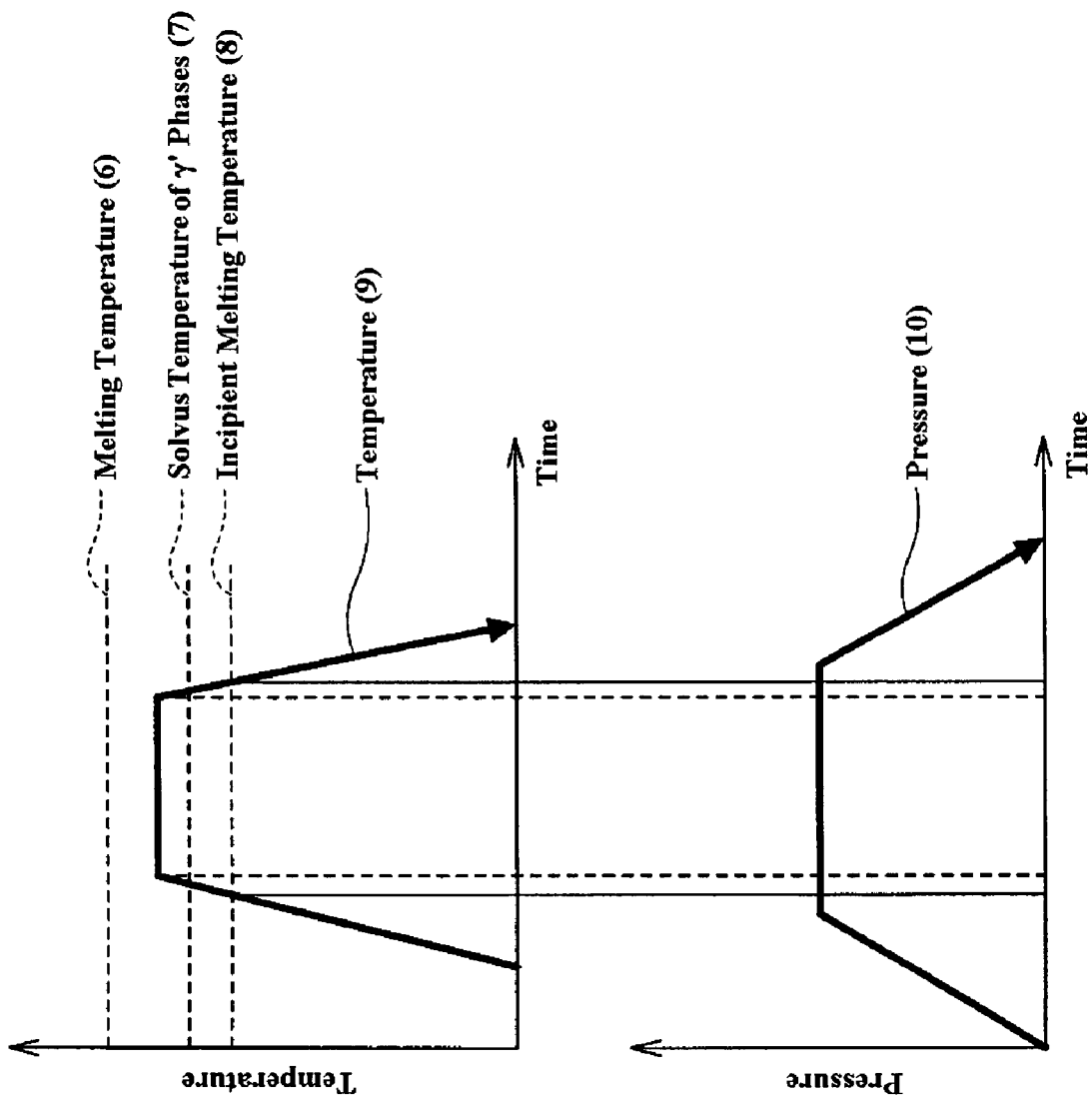
FIG. 2 is a schematic diagram showing an example of time charts of temperature and pressure during the recovery heat treatment process.

FIG. 2 contains schematic diagrams showing an example of time charts for applying pressure and temperature during the recovery heat treatment process.

In this example, the predetermined temperature of the recovery heat treatment process is set at the temperature higher than a solvus temperature 7 of the γ' phases or incipient melting temperature 8 and lower than a melting temperature 6, as shown in FIG. 2. A temperature 9 during the recovery heat treatment process S102 is raised to around the predetermined temperature.

This predetermined temperature is a temperature that is suitable for the recovery heat treatment. It may be any temperature between the solution temperature of the precipitates, which are the γ' phases in this embodiment, and incipient melting temperature as adjusted due to the high pressure environment. However, even in this temperature range, higher temperature may cause deformation of the component by the weight of the component itself because the strength of the component is weakened in the high temperature. Therefore, the temperature of the recovery heat treatment may be determined in such a way that the component will not severely deform due to its weight.

Preferably, pressure 10 is increased and held at the predetermined pressure during the recovery heat treatment. This pressure may be set at any pressure that can avoid depression of the melting points of the grain boundary strengthening elements or other impurity elements segregating along the dendrite boundaries, and can accelerate diffusion of the γ' phases so that damages or defects such as casting defects, creep or fatigues, some of which is caused during the operation, can be recovered. The pressure is preferably less than the pressure at which the component will severely deform.

In this embodiment, the pressure 10 is kept at the predetermined pressure at the time when the temperature 9 is raised to exceed the solvus temperature 7 of the γ' phases or incipient melting temperature 8.

More precisely, in the recovery heat treatment process S102, increasing the pressure 9 to the predetermined pressure, which can avoid incipient melting of the alloy of the component, precedes increasing the temperature over the solvus temperature 7 of the γ' phases and the incipient melting temperature 8. On the other hand, when decreasing temperature toward the end of the process S102, decreasing the pressure 10 from the predetermined pressure, which can avoid incipient melting of the alloy of the component, comes after decreasing the temperature 9 to be under the solvus temperature 7 of the γ' phases and the incipient melting temperature 8.

It is preferable to perform analogous treatments on the component as with newly manufactured components, which is cast and solidified, after the recovery heat treatment. For this reason, the cooling rate of the component after the recovery heat treatment may be preferably set between 10 to 100° C./min.

As described, the solution heat treatment S103 and the aging heat treatment S104 are applied after the recovery heat treatment S102. However, the solution heat treatment S103 may be applied by holding the temperature at a predetermined temperature, which is suitable for the solution heat treatment S103, in connection with decreasing temperature at the end of the recovery heat treatment process S102 and then quenching the component. This can be applied when the apparatus for the recovery heat treatment is equipped with a gas cooler which can accomplish a cooling rate greater than 40° C./min.

According to this embodiment, the incipient melting due to the segregation of the grain boundary strengthening elements can be avoided because the component is under high pressure environment, which raises the incipient melting temperature, when the temperature 9 is raised to exceed the solvus temperature 7 of the γ' phases and/or incipient melting temperature 8. Therefore, recovery heat treatment S102 may be done so that the γ' phases are fully dissolved without having defects caused by the incipient melting.

The embodiment is preferably suitable for the component of nickel base precipitation strengthening type alloy, whose main precipitation strengthening phases are the γ' phases [$Ni_3$(Al, Ti)]. Particularly, it may be suitable for the component of a convensional casting (equiaxed grain) or a directionally solidified casting.

It may be suitable for single crystal alloy that includes the grain boundary strengthening elements, which locally segregates in the alloy and depresses the melting point. These alloys have a characteristic that a heat treatment processed at the temperature between the solvus temperature of the γ' phases and the incipient melting temperature is difficult to apply, because maximum temperature of a heat treatment after casting is close to the solvus temperature of the γ' phases, which are main precipitation strengthening phases, or that the incipient melting temperature is less than the solvus temperature.

The γ' phases of the nickel base alloy, which is degraded or deteriorated after its use, are coarsened and rounded to a spherical or flat shape having sizes over 1 μm, and minute γ' phases having sizes under 0.1 μm disappear. The embodiment may recover the microstructure of the alloy comprising the γ' phases of cubic shape having the average size from 0.3 to 0.8 μm, and fine spherical γ' phases having the size under 0.1 μm. This microstructure of the alloy, which is refurbished by the embodiment, may be equivalent to or even better than that of the newly manufactured component.

During the recovery heat treatment S102, the component is placed under high pressure and high temperature environment. Controlling the temperature during the recovery heat treatment S102 is made easier because inert gas, such as an argon gas, introduced and pressurized in the pressure vessel may have larger density and thermal expansion coefficient, which contributes to facilitate heat convection during the recovery heat treatment. For example, density of argon gas in the condition of 1000° C. and 100 MPa is as 1000 times as the density in the normal pressure. This also contributes to creating uniformity of the temperature distribution inside the pressure vessel.

The refurbishing process in accordance with the embodiment may be preferably applied when the component, to which the refurbishing process is applied, has creeps or fatigues that may not cause recrystalization after the process. This may be accomplished by refurbishing the component within an administered life, which is predetermined based on design life of the component. Alternatively, the refurbishing process may be applied when an effective cross section of the component, which sustains an external force caused by an environmental factor, will have more than a half of the administered life after the process. In other words, the refurbishing process may be applied when a local creep deformation (creep strain) of the component is within 1% at critical portion and within 2% at non-critical portion before entering an acceleration range from a steady range.

The component, to which the refurbish process is applied, may be a gas turbine component which is exposed to the high temperature such as a turbine blade, a turbine nozzle, the combustion liner or the transition piece. The embodiments of the invention are not limited to these particular components, and may be applied to any component subject to deterioration analogous to the identified components.

An experimentation of the refurbishing process was held to evaluate the effectiveness of the embodiment. IN738LC superalloy, which is a nickel base alloy used for the gas turbine, was used for the experiment. A chemical composition of the IN738LC superalloy is shown in Table 1.

TABLE 1

Chemical Composition of the IN738LC Superalloy (wt %)

| C | Cr | Co | W | Mo | Ti | Al | Nb | Ta | B | Zr | Ni |
|---|----|----|----|----|----|----|----|----|----|----|----|
| 0.1 | 16 | 8.5 | 2.6 | 1.75 | 3.4 | 3.4 | 0.9 | 1.75 | 0.01 | 0.05 | bal |

As shown in Table 1, the IN738LC superalloy has the chemical composition including C, Cr, Co, W, Mo, Ti, Al, Nb, Ta, B, Zr, and Ni. Furthermore, the IN738LC superalloy has processed a heat treatment after casting at the temperature that the γ' phases, which are the main precipitation strengthening phases of the IN738LC superalloy, can partially dissolve into the γ phases, which are base metal.

At first, the solvus temperature of the γ' phases, the incipient melting temperature, and melting point of the experimental piece of the IN738LC superalloy were obtained through differential thermal analysis. In addition, the solvus temperature of the γ' phases and the incipient melting temperature are obtained by visually inspecting the microstructure of test pieces that have been held at the temperature and then have been quenched. Table 2 below shows the temperatures provided (a) through the differential thermal analysis and (b) visual inspection of the heated and quenched test piece.

TABLE 2

Characteristic Temperatures of the Experimental Piece of the IN738LC Superalloy (° C.)

| | Solvus temperature of γ' phases | Incipient melting temperature | Melting point |
|---|---|---|---|
| Differential thermal analysis | 1,160 to 1,175 | 1,240 to 1,250 | 1,270 to 1,375 |
| Visual inspection of the microstructure of the alloy | 1,180 | 1,220 | N/A |

As shown in Table 2, the solvus temperature of the γ' phases was 1,160 to 1,175° C. And the incipient melting temperature, which is the temperature the incipient melting begins, was 1,240 to 1,250° C. These results obtained by the experiment proved the result of Burton et al (Proc. Vacuum Metallurgy Conf., Columbus, Ohio, Jun. 23 to 25, 1975). Melting point was 1,270 to 1,375° C. according to the differential thermal analysis. However, the incipient melting of the γ' phases was observed at 1,205° C. by the visual inspection of the experimental piece that had held at this temperature and then had been quenched. This result indicates that the incipient melting of the γ' phases actually occurs at the temperature considerably lower than indicated by differential thermal analysis.

Figure 3:
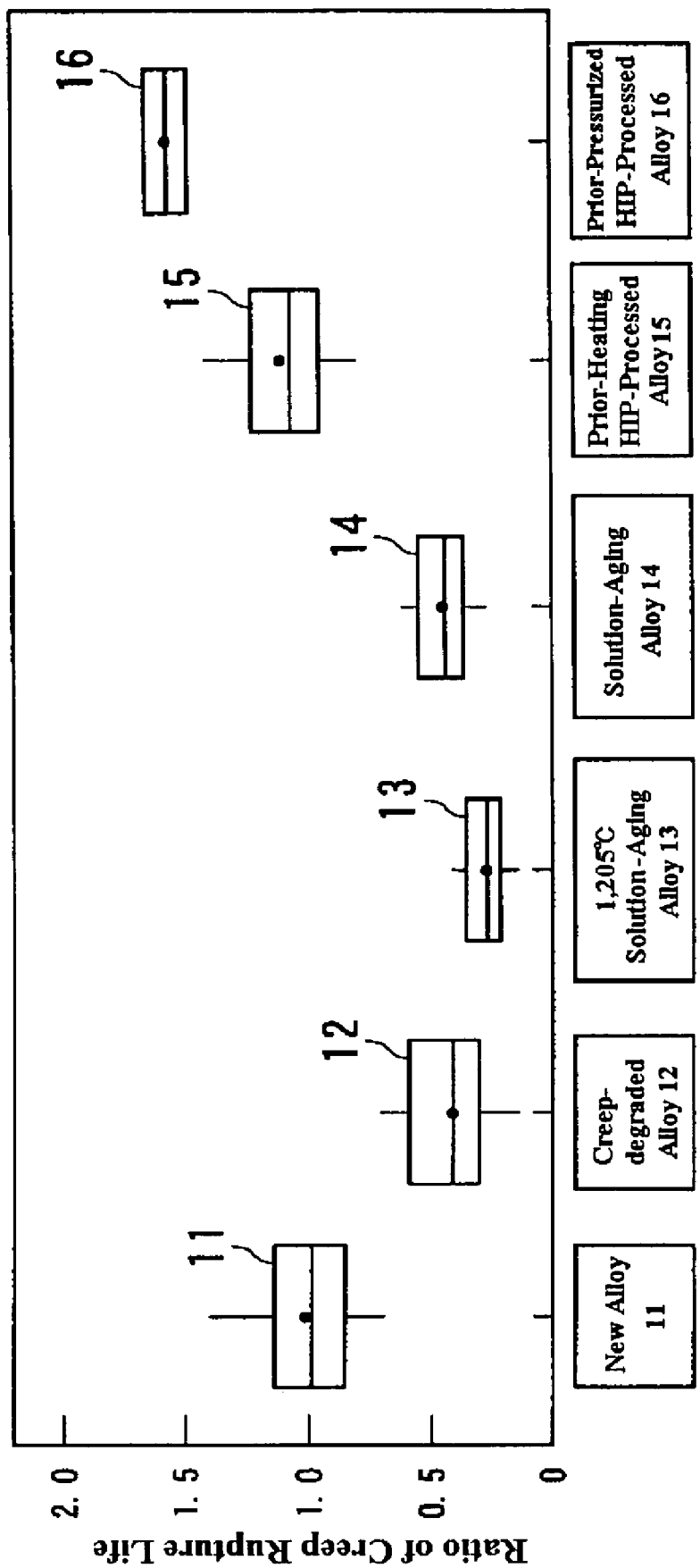
FIG. 3 is a graph showing experimental results of a ratio of creep rupture life of the alloys in accordance with the first embodiment.

FIG. 3 shows the result of the experimentation. The vertical axis of the graph indicates creep rupture life of the alloys including the alloy refurbished in accordance with the embodiment. The creep rupture life of the alloys are shown as ratios against a newly manufactured alloy 11. Along the horizontal axis, test pieces of different conditions including refurbished alloy 16 (referred to as "prior-pressurized HIP-processed alloy 16") in accordance with the embodiment are shown.

Numeral 11 indicates a newly manufactured alloy. Numeral 12 indicates a creep-degraded alloy, which has a creep damage caused in a condition of 900° C. and 300N.

Numeral 13 indicates a 1,205° C. solution-aging alloy, which is the creep-degraded alloy 12 subjected to the solution heat treatment S103 at 1,205° C. and the aging heat treatment S104 at 843° C., which is a typical temperature for the aging heat treatment. The temperature (1,205° C.) of this solution heat treatment was higher than the solvus temperature of the γ' phases.

Numeral 14 indicates a solution-aging alloy, which is the creep-degraded alloy 12 subjected to the solution heat treatment S103 at 1,120° C., which is a typical temperature for the solution heat treatment, and the aging heat treatment S104 at its typical temperature.

Numeral 15 indicates a prior-heated HIP-processed alloy, which is the creep-degraded alloy 12 subjected to the recovery heat treatment, but without pressurizing prior to heating. More precisely, during the recovery heat treatment of the prior-heated HIP-processed alloy 15, the temperature was first increased to 1,205° C. and then the pressure was increased over 100 MPa.

Numeral 16 indicate the prior-pressurized HIP-processed alloy, which is the creep-degraded alloy 12 processed in accordance with this embodiment, which means the temperature of the alloy is increased to the predetermined temperature under the predetermined pressure during the recovery heat treatment process S102. More precisely, during the recovery heat treatment process S102 of the prior-pressurized HIP-processed alloy 16, the pressure was first increased over 100 MPa and then the temperature was increased from 1,120° C. to 1,205° C.

The strength of three test pieces cut from each of the alloys 11 to 16 were examined. Each result shown in FIG. 3 for each of alloys 11 to 16 is based upon strength data obtained by examining the three test pieces. The average creep rupture life of the newly manufactured alloy 11 is defined as 1.0.

In FIG. 3, bar line of each of the graph indicates a range of a maximum value and a minimum value. A box shows a range between −3σ and +3σ, wherein σ means the standard deviation. A horizontal bar shows a center value and a point shows a mean (an average) value.

As shown in FIG. 3, recovery of the microstructure of the alloy is not observed for the solution-aging alloy 14, and instead it is sometimes further degraded as compared to the creep-degraded alloy 12. The strength measurements of the 1,205° C. solution-aging alloy 13 have large deviation. Some test pieces of the 1,205° C. solution-aging alloy 13 recovered, while others did not. Especially, one of the test pieces of the 1,205° C. solution-aging alloy 13, which did not recover, was the test piece cut from where the incipient melting occurred. The strength of this test piece was considerably weakened; it was less than the strength of the creep-degraded alloy 12.

HIP-processed alloys 15 and 16, both of which were applied typical solution heat treatment and aging heat treatment after the recovery heat treatment, had a creep rupture life greater than the newly manufactured alloy 11. However, the result of prior-heated HIP-processed alloy 15 had a deviation larger than that of the newly manufactured alloy 11. The prior-pressurized HIP-processed alloy 16 had a considerably smaller deviation.

Both of incipient meltings and casting defects were observed at the torn surface of the test piece having smaller strength in the 1,205° C. solution-aging alloy 13. On the other hand, only the casting defects were observed at the fracture surface of the test pieces of the solution-aging alloy 14. The prior-heated HIP-processed alloy 15 was recovered, however, the deviation was the same level as the newly manufactured material 11. The test piece having the weakest creep rupture strength among the three test pieces of the prior-heated HIP-processed alloy 15 had recrystalized grains in its microstructure of the alloy. The coarsened grains had dissolved and resolidified, and or recrystalized structures. On the other hands, the prior-pressurized HIP-processed alloy 16 had relatively smaller deviation. Grainboundary that had dissolved and resolidified, or recrystalize grain was not observed in the test pieces of the prior-pressurized HIP-processed alloy 16.

According to another aspect, the effect of the cooling ratio after the recovery heat treatment is explained below.

Figure 4:
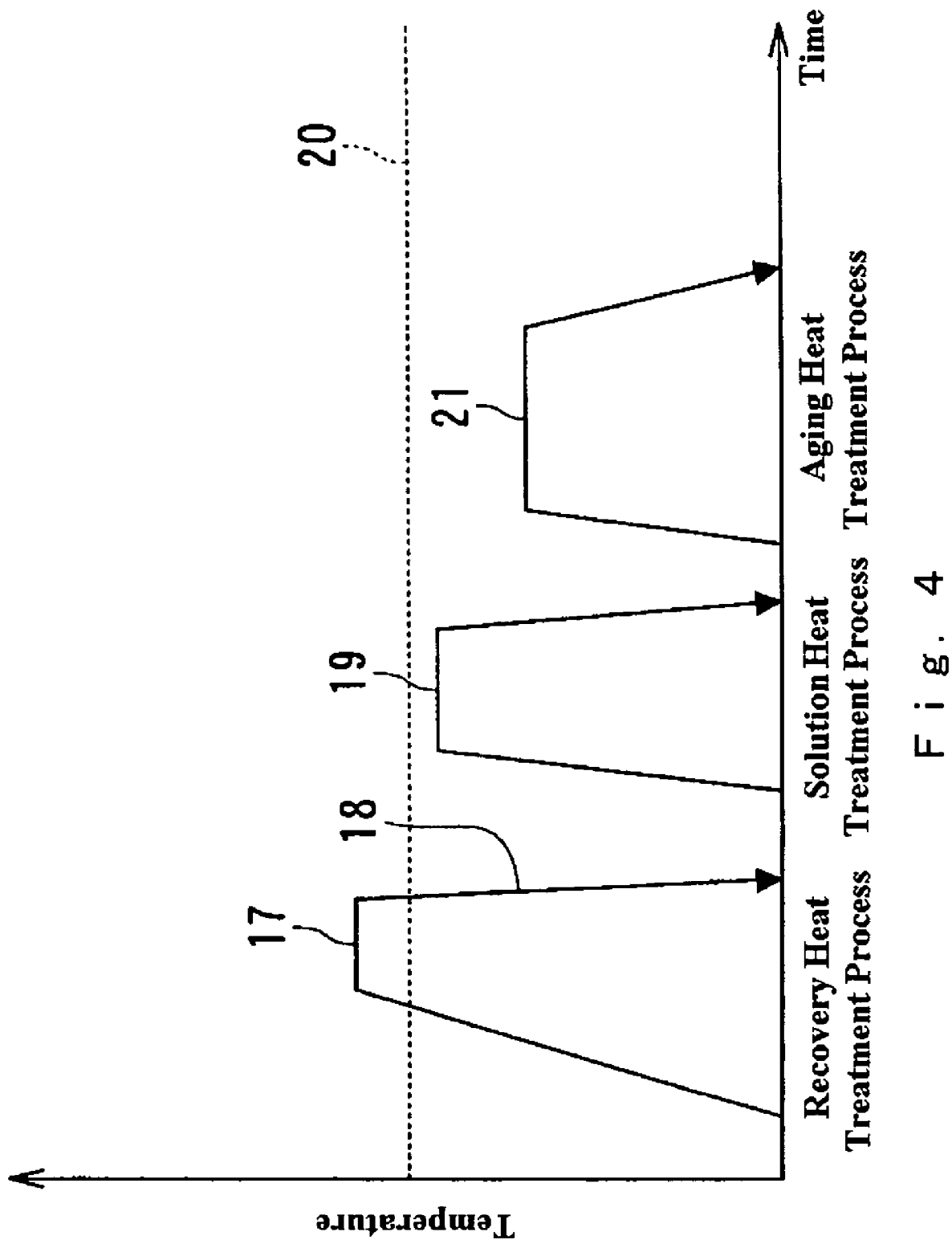
FIG. 4 is a schematic time chart showing the temperature during a refurbishing process.

FIG. 4 is a schematic time chart showing the temperature during a refurbishment process of the prior art (which is for example shown in Japanese Patent Publication (Kokai) No. 8-271501). This refurbishment process comprises the recovery heat treatment process 17 (referred to as "HIP process"), a partial solution heat treatment process 19, and the aging heat treatment process 21. In FIG. 4, a numeral 20 indicate a solvus temperature of the γ' phases.

The HIP process is applied at the temperature higher than the solvus temperature 20 of the γ' phases. The partial solution heat treatment process 19 is applied at the temperature less than the solvus temperature 20 of the γ' phases. The aging heat treatment process 21 is applied at the temperature less than the temperature of the solution heat treatment process 19. A cooling process 18 of the HIP process 17 is a furnace cooling.

Table 3 shows the results of experimentation of the strengths and visual inspections of the microstructure of the alloys. Test pieces of newly manufactured blade 22, scrapped blade 23, and refurbished blades 24 to 27 were examined. The scrapped blade 23 was used in actual gas turbine until their design life. The refurbished blades 24 to 27 had been used in actual gas turbine until their design life, and then refurbished.

Each of the refurbishing process included the recovery heat treatment process (HIP process) 17, the solution heat treatment process 19, and the aging heat treatment process 21. The temperature of the solution heat treatment process 19 was a typical temperature for the solution heat treatment, which was less than the solvus temperature 20 of the γ' phases. The temperature of the aging heat treatment process 21 was also typical temperature for the aging heat treatment, which was less than the temperature of the solution heat treatment 19. The cooling rates during the cooling process 18 were set as 5, 20, 40, and 150° C./min for each of the refurbished blades 24 to 27, respectively.

TABLE 3

Effect of the Cooling Rate After the Recovery Heat Treatment (HIP) Process

| | Type of blade | Cooling rate after the recovery heat treatment (° C./min) | Visual inspection Result | Creep test result |
|---|---|---|---|---|
| 22 | New | N/A | B | B |
| 23 | Scrapped | N/A | D | D |
| 24 | HIP processed | 5 | C | C |
| 25 | HIP processed | 20 | A | A |
| 26 | HIP processed | 40 | A | A |
| 27 | HIP processed | 150 | C | C |

Symbols shown in the result column of the table are indicated as;
A: more than the newly manufactured blade,
B: the same as the newly manufactured blade,
C: some recovery from the scrapped blade were observed, and
D: the same as the scrapped blade.

In this experiment, the test piece 24 was gradually cooled by furnace cooling, wherein the cooling rate during the cooling process 18 was 5° C./min. The test piece 27 was rapidly cooled by argon gas, wherein the cooling rate was 150° C./min. Further, the test pieces 25 and 26 are cooled at the cooling rates, which were 20° C./min and 40° C./min respectively, between those of gradual cooling and rapid cooing.

As shown in Table 3, some recovery was observed in comparison with the scrapped blade 23 in the test piece 24 and the test piece 27, however the recovery was not sufficient. The test pieces 25, 26 recovered to have the microstructures of the alloy and the creep strengths equivalent to or better than those of the newly manufactured blade 22.

Figure 5:
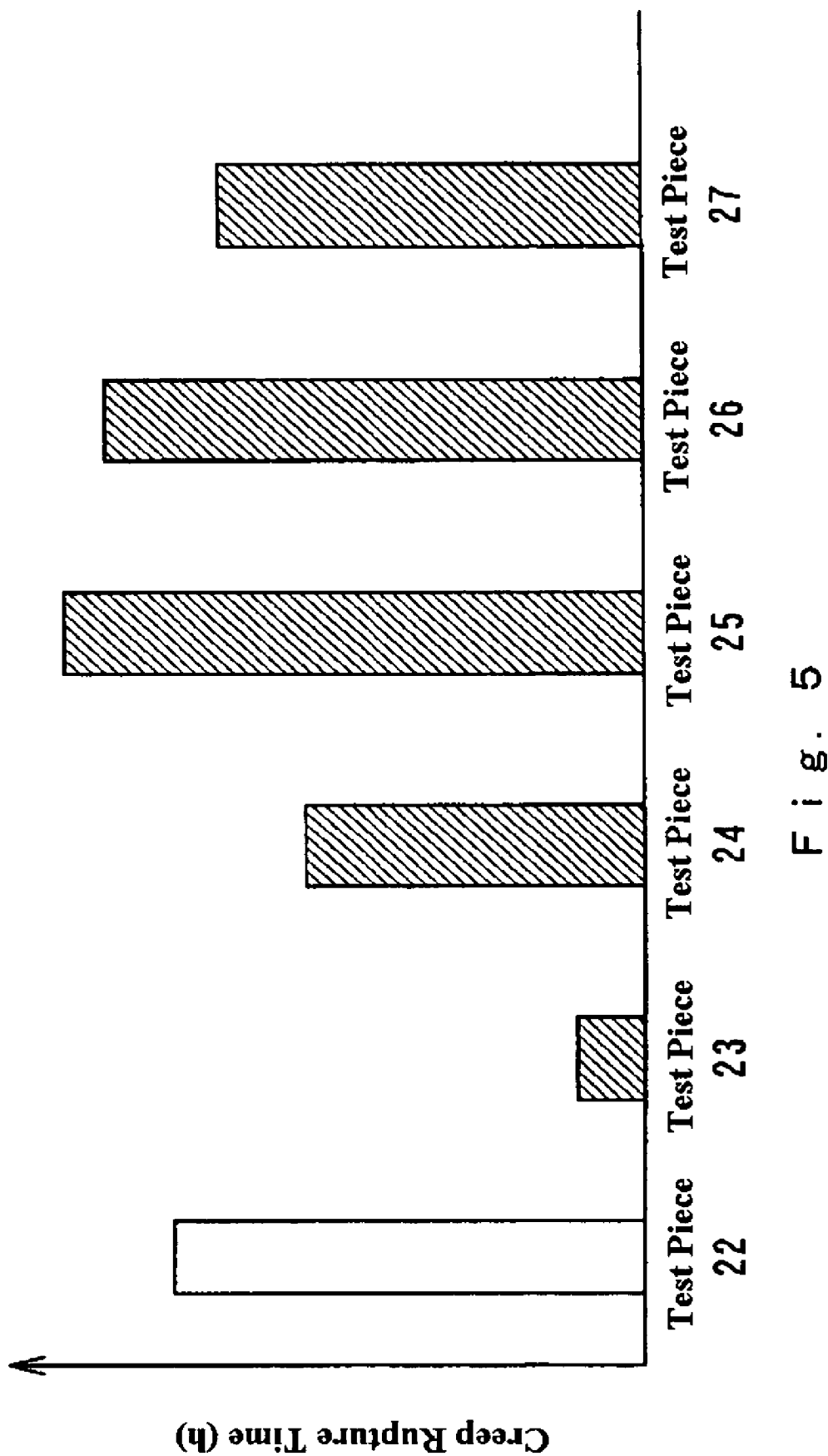
FIG. 5 is a graph shows the result of the creep rupture time based on experiment.
Figure 6:
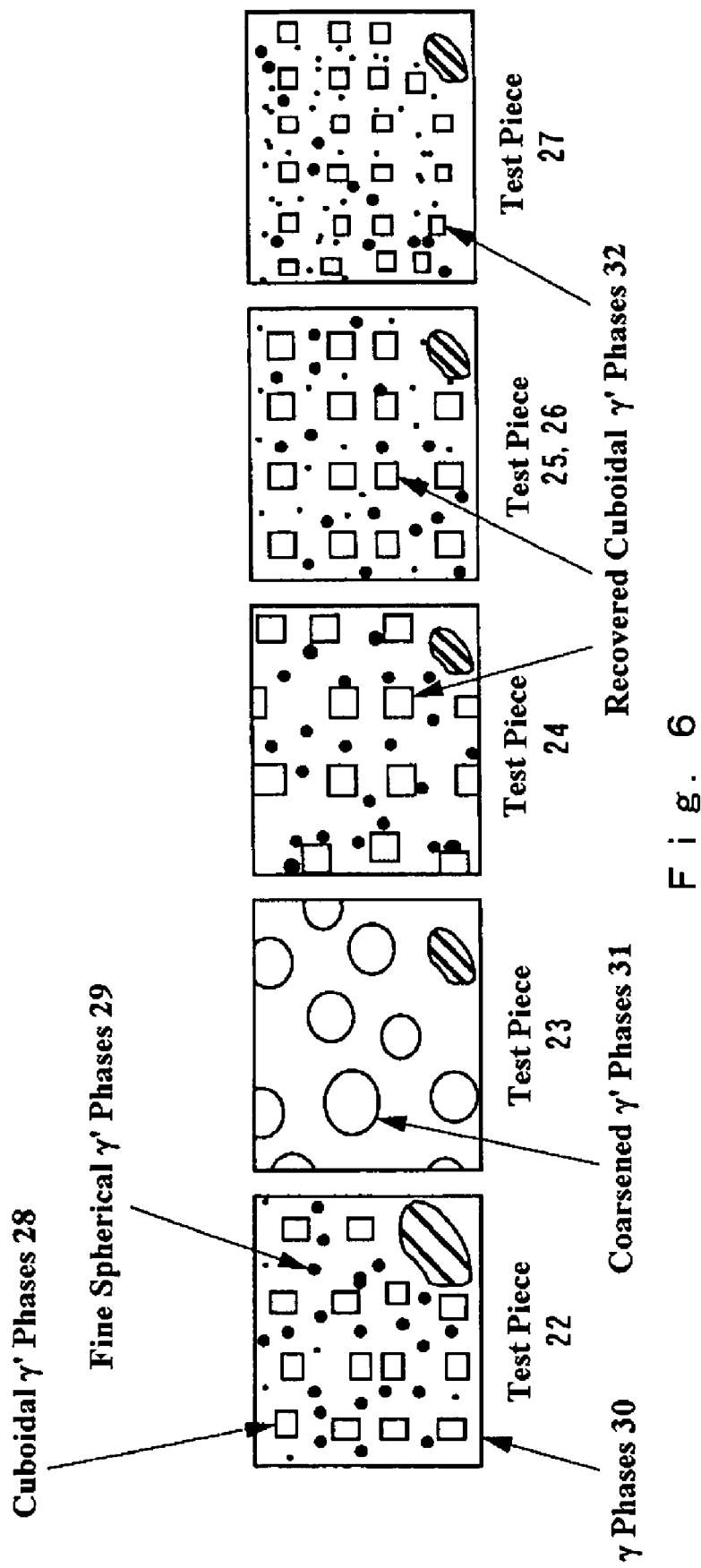
FIG. 6 contains schematic drawings of microstructures of the test pieces used in the experimentation.

FIG. 5 is a graph shows the result of the creep rupture time in accordance with the experimentation shown in Table 3. FIG. 6 is a schematic drawing of microstructures of the test pieces used in the experimentation.

As shown in FIG. 6, the microstructure of the newly manufactured blade 22 comprises cuboidal γ' phases 28 having the sizes between 0.3 and 0.7 μm, and fine spherical γ' phases 29 having the size under 0.1 μm. The microstructure of the scrapped blade 23, which has been used in the gas turbine, comprises coarsened γ' phases 31, which have rounded shapes. The alloy degrades during the operation of the gas turbine as its microstructure has more coarsened γ' phases 31. The creep rupture time is considerably shortened due to this degradation and other damages.

The microstructures of the refurbished blades 24 to 27 also include recovered cuboidal γ' phases 32, which are like the cuboidal γ' phases 28 in the microstructure of the newly manufactured blade 22. The coarsened γ' phases 31 are dissolved in a γ phase 30, which is a base metal, during the recovery heat treatment process (HIP process) 17, and then the γ' phases re-precipitates during the cooling process 18, the solution heat treatment process 19, and the aging heat treatment process 21 like the newly manufactured blade 22.

However, the sizes of the recovered cuboidal γ' phases 32 in the test piece 24, which was gradually cooled during the cooling process 18, are larger than the cuboidal γ' phases 28 in the newly manufactured blade 22 because recovered cuboidal γ' phases 32 enlarges during the cooling process 18. This enlargement of the recovered cuboidal γ' phases 32 during the cooling process 18 is not recovered by the following solution heat treatment process 19 and aging heat treatment 21. And, sufficient creep strength is not obtained with the test piece 24.

Further, when the cooling rate of the cooling process 18 is too large, the recovered cuboidal γ' phases 32 may not grow enough. And the size of the recovered cuboidal γ' phases 32, which are shown in microstructure of the test piece 27 in FIG. 6, may not be recovered by the following solution heat treatment process 19 and aging heat treatment 21. In this case, the creep strength is not sufficiently recovered.

As shown in FIG. 6, desired cooling rate for recovering the microstructure of alloy sufficiently may be in a range between 20° C./min and 40° C./min. Therefore, the apparatus for the recovery heat treatment may be preferably equipped with a gas cooler which can accomplish a cooling rate greater than 40° C./min.

Figure 7:
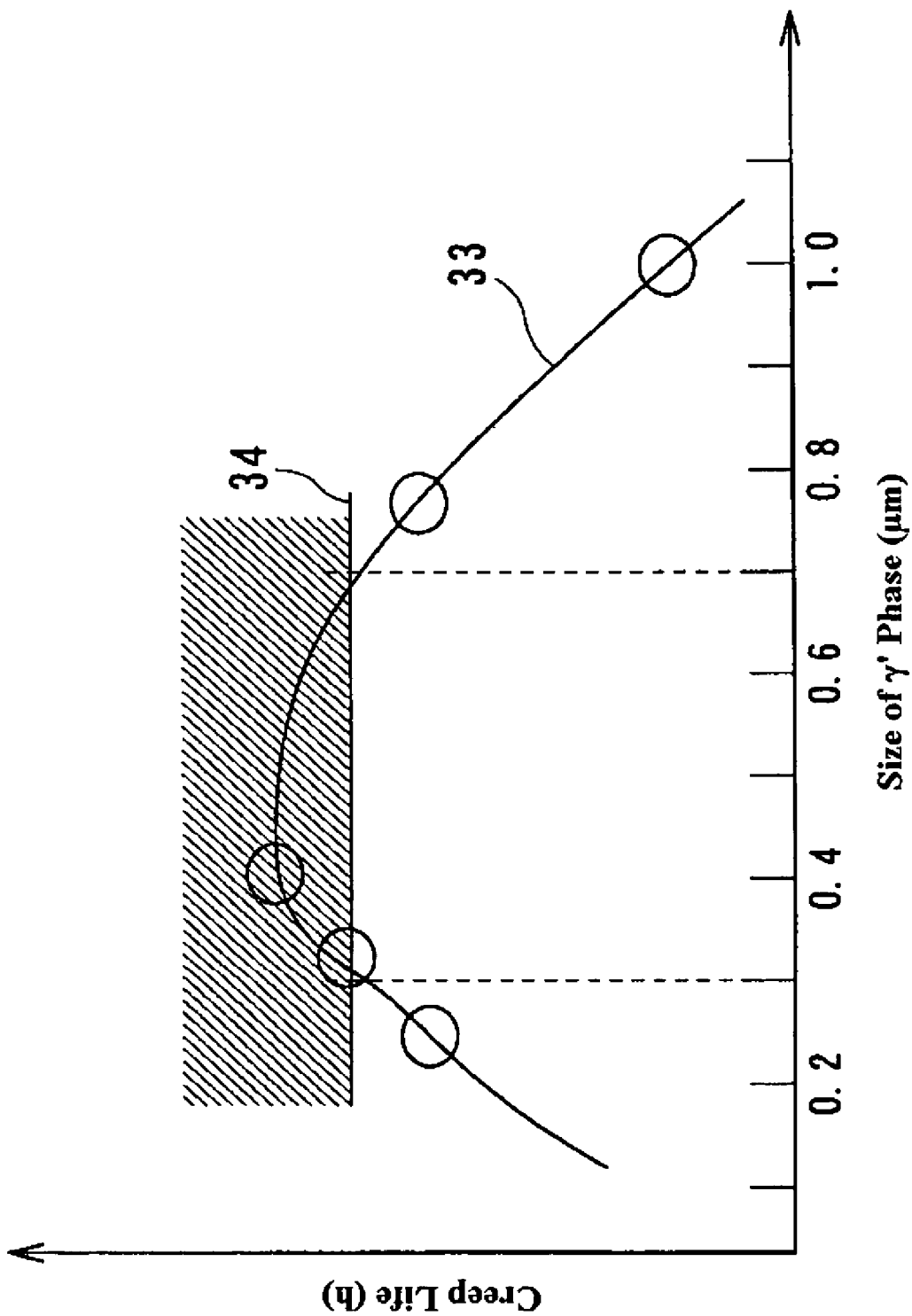
FIG. 7 is a graph showing relationship between the sizes of the γ' phases and the creep rupture life.

FIG. 7 is a graph illustrating the relationship between the sizes of the γ' phases and the creep life.

In FIG. 7, numeral 33 indicates a correlation curve between the sizes of the γ' phases and the creep rupture life. Numeral 34 indicates the creep rupture life of the newly manufactured blade.

As shown in FIG. 7, when the size of the γ' phases are recovered in a range between 0.3 and 0.71 μm, the refurbished blade may have sufficient creep strength. In other words, the coarsened γ' phases 31 having the size more than 0.7 μm, recovered to be within 0.3 to 0.7 μm, by the embodiment may have sufficient strength compared to the newly manufactured blade.

In another aspect, timing of the refurbishing process of the component is explained below.

Figure 8:
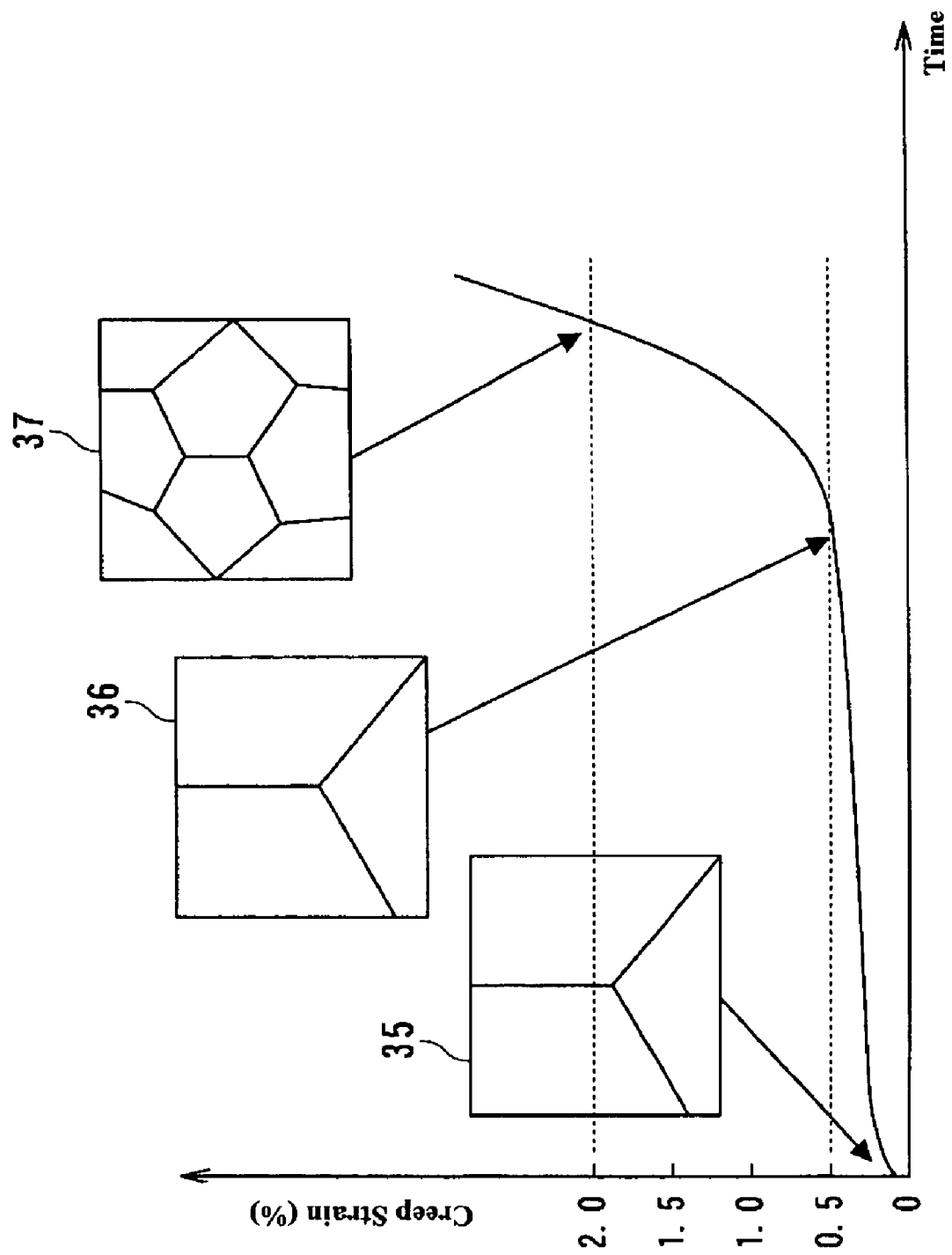
FIG. 8 is a graph showing the creep curve of the IN738LC superalloy with schematic drawings of the matrices of refurbished alloys.

FIG. 8 is a graph showing the creep curve of the IN738LC superalloy with schematic drawings of matrices of the refurbished alloys.

In FIG. 8, the vertical axis indicates creep strain of the IN738LC superalloy that is applied stress of 240N at 900° C. Horizontal axis indicates time that the stress has been applied. Further, numerals 35 to 37 are the schematic drawings of the grain boundaries of the γ phases, which are matrices of the alloy, of the refurbished alloys. Each of the schematic drawings 35 to 37 is regarding the refurbished alloy that is refurbished at the time the arrow indicates.

The microstructure 35 shows grain boundaries of the γ phases, which are matrices, of the new alloy. The microstructure 36 shows grain boundaries of the γ phases, which are matrices, of the alloy refurbished by the HIP process, solution heat treatment process, and aging heat treatment process when the creep strain of the alloy is 0.5%. The microstructure 37 shows grain boundaries of the γ phases, which are matrices, of the alloy refurbished by the HIP process, solution heat treatment process, and aging heat treatment process when the creep strain of the alloy is 2%.

As shown in FIG. 8, the microstructure 37, which is refurbished when the creep strain is 2%, comprises smaller grains of the γ phases, which are re-crystallized during the HIP process. These smaller grains of the γ phases weaken the strength of the alloy. Therefore, the refurbishing process is preferably applied to the component before the local creep strain of the alloy exceeds 2%.

In another aspect, deformation of the component during the recovery heat treatment is explained below with reference to FIGS. 9 and 10.

Figure 9:
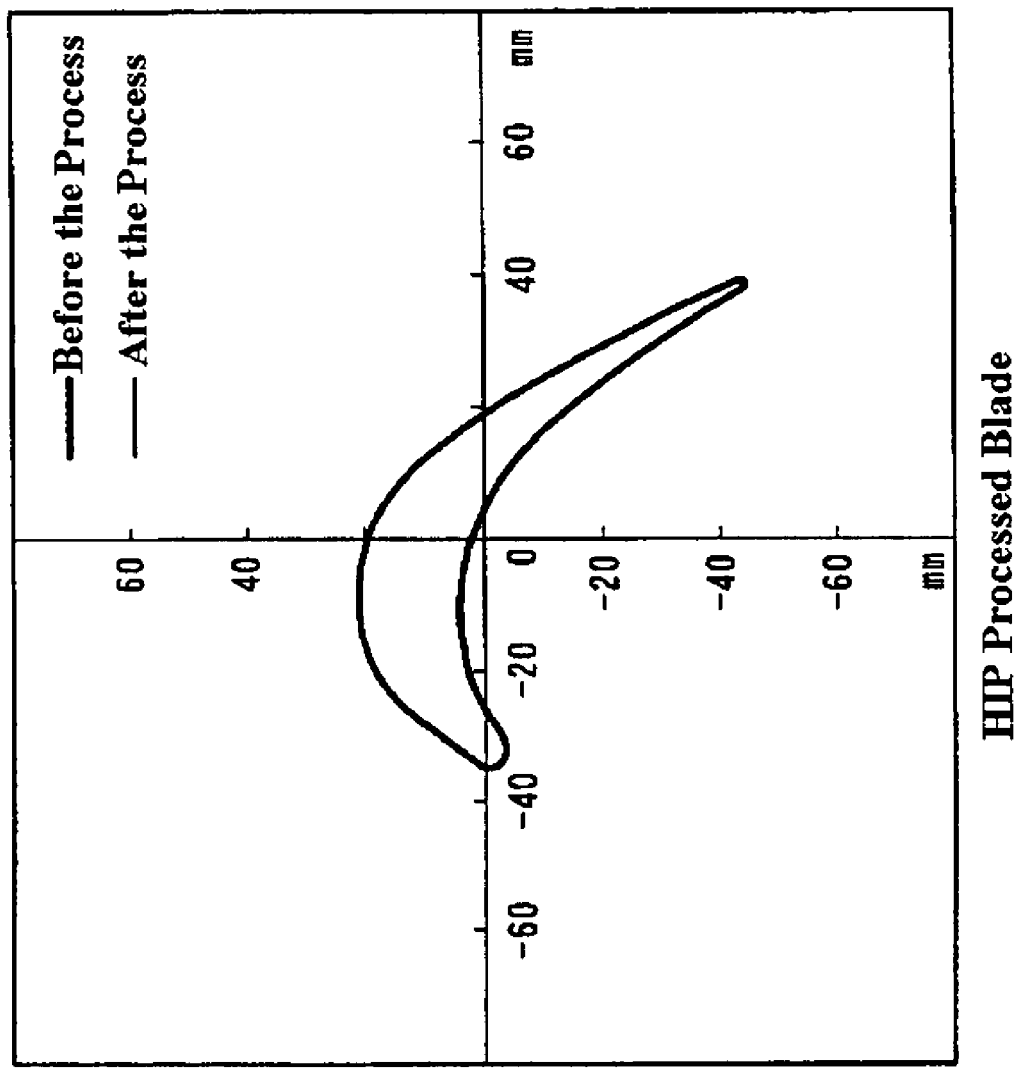
FIG. 9 shows a result of the three-dimensional measurement of the turbine blade before and after the refurbish process.

FIG. 9 shows a result of the three-dimensional measurement of the turbine blade before and after the refurbish process that includes a recovery heat treatment process (HIP process) though not necessarily where pressure is increased first. The recovery heat treatment process was applied to the turbine blade that had been used for 60,000 hours in the gas turbine at 1,205° C. and 100 MPa. In FIG. 9, two-dimensional shapes around the tip portion of the blades are shown. A bold line indicates the shape of the blade before the refurbishment process, while a fine line indicates after the refurbishment process.

Figure 10:
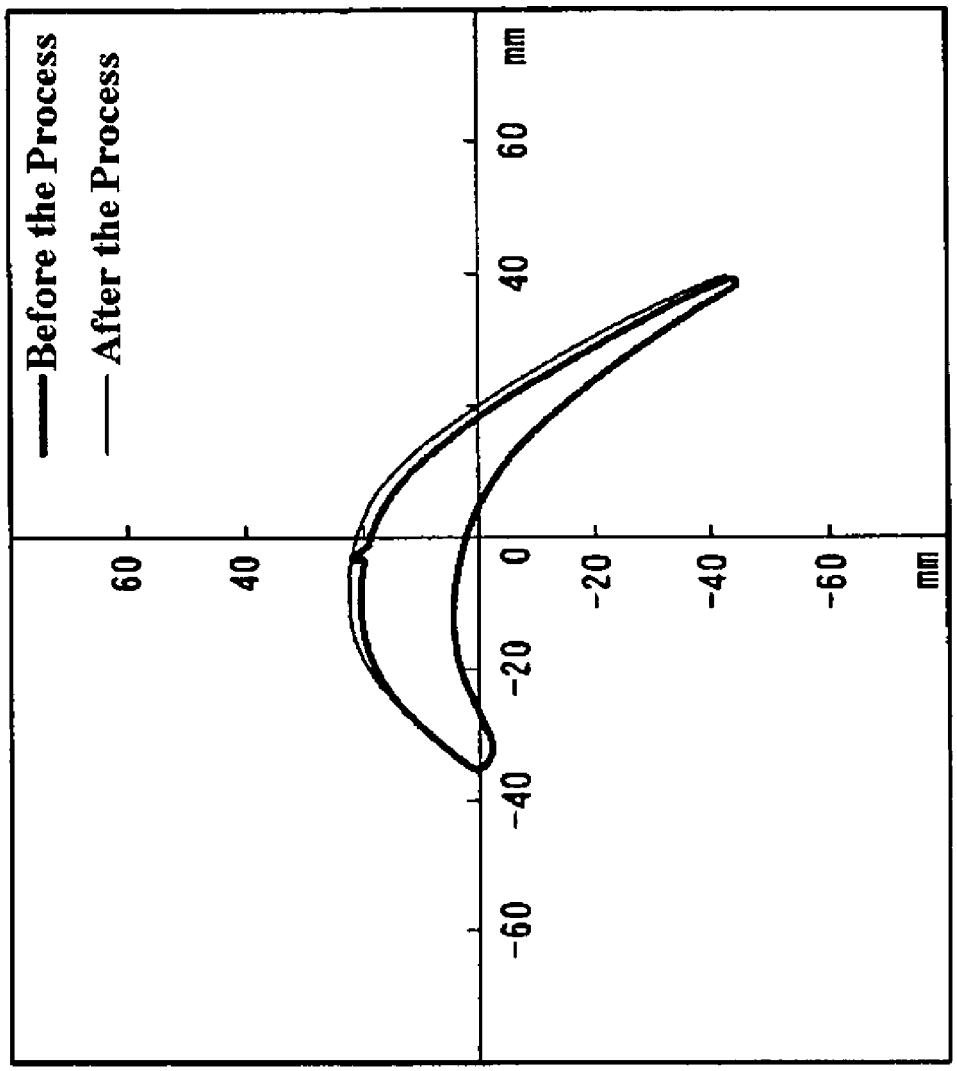
FIG. 10 shows a result of the three-dimensional measurement of the turbine blade before and after typical heat treatment process.

On the other hand, FIG. 10 shows a result of the three-dimensional measurement of the turbine blade before and after typical solution heat treatment process, which is applied without pressurizing. The solution heat treatment process was applied to the turbine blade that had been used for 60,000 hours in the gas turbine at 1,205° C. and reduced pressure environment. In FIG. 10, two-dimensional shapes around the tip portion of the blades are shown as same as FIG. 9. A bold line indicates the shape of the blade before the refurbish process, while a fine line indicates after the refurbish process.

As shown in FIGS. 9 and 10, the turbine blade shown in FIG. 10, to which the typical solution heat treatment process was applied, deformed before as compared to after the process. While the turbine blade shown in FIG. 9, to which the HIP process was applied, had no deformation due to the process.

This difference is because temperature distribution inside the turbine blade is made uniform during the recovery heat treatment process (HIP process) due to the facilitation of heat convection. It is generally known that, the density of argon at 100 MPa is 1,000 times larger than normal pressure. Viscosity is also increased to 7 g/cm·sec at 100 MPa from 6 g/cm·sec at normal pressure. At 100 MPa environment, thermal expansion coefficient of argon is also large. Therefore, heat convection is facilitated and heat transfer coefficient is increased, and thus the temperature distribution inside the blade is made uniform during the recovery heat treatment process (HIP process). When the temperature distribution inside the turbine blade is made uniform, deformation due to the release of strains kept in the blade during increasing of the temperature may be minimized.

The refurbishing process can be applied, not only the IN738LC superalloy, but also U500™ superalloy, GTD111™ superalloy, and Rene80™ superalloy. Chemical compositions of these superalloys are shown in Table 4.

TABLE 4

| | Chemical Compositions of Superalloys. (wt %) | | | | | | | | | | |
|---|---|---|---|---|---|---|---|---|---|---|---|
| | C | Cr | Co | W | Mo | Ti | Al | Nb | Ta | B | Zr | Ni |
| U500 ™ | 0.07 | 18.5 | 18.5 | — | 4.0 | 3.0 | 3.0 | — | — | 0.006 | — | bal |
| GTD111 ™ | 0.10 | 14.0 | 9.5 | 3.8 | 1.5 | 4.9 | 3.0 | — | 2.8 | 0.010 | — | bal |
| Rene80 ™ | 0.08 | 14.0 | 9.5 | 4.0 | 4.0 | 5.0 | 3.0 | — | — | 0.015 | 0.03 | bal |

The refurbish process in accordance with the embodiment recovered the microstructures of turbine blades made of these superalloys or directionally solidifyed ones.

Furthermore, components using nickel base alloys such as a combustion liner, a transition piece and a turbine nozzle can be recovered by the refurbish process.

Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A method for refurbishing a service-degraded component formed of a precipitation strengthening type of alloy for a gas turbine, comprising:

performing a recovery heat treatment on the component in an environment having a predetermined pressure that avoids incipient melting of the alloy of the component, wherein the temperature of the component is increased to a predetermined temperature over a solvus temperature of the γ' phases and the incipient melting temperature of the alloy of the component in the environment having the predetermined pressure, whereby the pressure is held to avoid incipient melting of the alloy of the component;

performing a solution heat treatment, which is processed under reduced pressure or inert gas atmosphere, the solution heat treatment being performed after performing the recovery heat treatment; and performing an aging heat treatment, which is processed under reduced pressure or an inert gas atmosphere, the aging heat treatment being performed after performing the recovery heat treatment.

2. The method for refurbishing a service-degraded component according to claim 1, wherein the step of performing recovery heat treatment further comprises, after starting the recovery heat treatment, decreasing the temperature of the component from the predetermined temperature before starting decreasing the pressure from the predetermined pressure.

3. The method for refurbishing a service-degraded component according to claim 1, wherein the step of performing recovery heat treatment comprises:

increasing pressure of the component to the predetermined pressure;

retaining the pressure at the predetermined pressure; and increasing the temperature of the component to the predetermined temperature after the pressure has reached the predetermined pressure.

4. The method for refurbishing a service-degraded component according to claim 3, wherein the recovery heat treatment further comprises:

decreasing the temperature of the component from the predetermined temperature using a cooling rate, and;

decreasing the pressure of the component from the predetermined pressure after the temperature is decreased to less than at least one of the solvus temperature of γ' phases in the alloy or the incipient melting temperature of the component.

5. The method for refurbishing a service-degraded component according to claim 4, wherein the cooling rate is in a range between 10 and 100 degrees centigrade per minute.

6. The method for refurbishing a service-degraded component according to claim 4, wherein the cooling rate is in a range between 20 and 40 degrees centigrade per minute.

7. The method for refurbishing a service-degraded component according to claim 1, wherein the alloy includes Ni base metal, wherein a main precipitation strengthening phases are γ' phases.

8. The method for refurbishing a service-degraded component according to claim 7,
wherein the alloy has been subjected to a heat treatment at time of manufacture, whose maximum temperature is less than the solvus temperature after the alloy had been cast at time of manufacture.

9. The method for refurbishing a service-degraded component according to claim 7, wherein the alloy has been subjected to a heat treatment at time of manufacture after the alloy had been cast at time of manufacture,
wherein the heat treatment enables γ' phases dissolved partially in γ phases as its base metal.

10. The method for refurbishing a service-degraded component according to claim 7, further comprising:
inspecting the γ' phases in the alloy of the component,
wherein the step of performing the recovery heat treatment is performed to the components having an coarsened γ' phases including sizes larger than 0.7 μm.

11. The method for refurbishing a service-degraded component according to claim 1, wherein;
the component includes at least one element selected from the group consisting of B, Zr, Hf and C.

12. The method for refurbishing a service-degraded component according to claim 1, wherein;
the recovery heat treatment is performed during an expected life of the component.

13. The method for refurbishing a service-degraded component according to claim 1, wherein the recovery heat treatment is performed when the component reaches its estimated life based on an examination of the component.

14. The method for refurbishing a service-degraded component according to claim 1, wherein the recovery heat treatment is performed before the local creep strain of the component reaches 2%.

15. The method for refurbishing a service-degraded component according to claim 1, wherein the resulting component has γ' phases having a size in a range between 0.3 and 0.7 μm.

16. A method for refurbishing or strengthening a component formed of a precipitation strengthening type of alloy, comprising:
performing a recovery heat treatment on the component in an environment having a first predetermined pressure that avoids incipient melting of the alloy of the component and a predetermined temperature over a solvus temperature of the γ' phases and the incipient melting temperature of the alloy of the component, wherein the pressure is increased above a second predetermined pressure before the temperature is increased to the predetermined temperature, wherein the temperature is increased to the predetermined temperature, whereby the pressure is held to avoid incipient melting of the alloy of the component, and
wherein the first predetermined pressure is equal to or greater than the second predetermined pressure.

17. The method of refurbishing or strengthening a component according to claim 16, further comprising:
performing a solution heat treatment, which is performed under reduced pressure or inert gas atmosphere, the solution heat treatment being performed after the recovery heat treatment; and
performing an aging heat treatment, which is performed under reduced pressure or an inert gas atmosphere, the aging heat treatment being performed after the solution heat treatment.

18. The method of refurbishing or strengthening a component according to claim 17, wherein the second predetermined pressure is such that raising the pressure above the second predetermined pressure prevents incipient melting of the alloy of the component.

19. A method for refurbishing or strengthening a component formed of a precipitation strengthening type of alloy, comprising:
performing a recovery heat treatment to the component in an environment having a predetermined pressure that avoids incipient melting of the alloy of the component and a predetermined temperature over a solvus temperature of the γ' phases and the incipient melting temperature of the alloy of the component,
wherein a pressure of the environment is adjusted to the predetermined pressure before a temperature of the environment is increased to the predetermined temperature, wherein the temperature of the environment is increased to the predetermined temperature, whereby the pressure is held to avoid incipient melting of the alloy of the component;
performing a solution heat treatment, which is performed under reduced pressure or inert gas atmosphere, the solution heat treatment being performed after the recovery heat treatment; and
performing an aging heat treatment, which is performed under reduced pressure or an inert gas atmosphere, the aging heat treatment being performed after the recovery heat treatment.

* * * * *